United States Patent [19]

Shirata et al.

[11] Patent Number: 5,119,010
[45] Date of Patent: Jun. 2, 1992

[54] POWER SUPPLY DEVICE

[75] Inventors: Akihiro Shirata, Yokohama; Toshifumi Koshizawa, Kawasaki; Yuichi Koyama, Machida; Yoshinobu Tsuchiya, Fujisawa, all of Japan

[73] Assignee: Isuzu Motors Limited, Tokyo, Japan

[21] Appl. No.: 501,748

[22] Filed: Mar. 30, 1990

[30] Foreign Application Priority Data

Jul. 27, 1989 [JP] Japan .................. 1-195345

[51] Int. Cl.$^5$ .................. H02J 7/00
[52] U.S. Cl. .................. 320/15; 320/61; 320/1
[58] Field of Search .................. 320/3, 4, 13, 14, 15, 320/61, 1; 363/61; 307/110; 290/50

[56] References Cited

U.S. PATENT DOCUMENTS

| | | | |
|---|---|---|---|
| 2,979,551 | 4/1961 | Pack | 320/61 X |
| 3,683,258 | 8/1972 | Harbonn | 320/61 |
| 3,693,068 | 9/1972 | Bogue et al. | 320/13 |
| 3,798,527 | 3/1974 | DuPlessix et al. | 320/61 X |
| 4,016,474 | 4/1977 | Mason | 320/15 |
| 4,313,078 | 1/1982 | Bilsky et al. | 320/15 |
| 4,792,743 | 12/1988 | Tsujino et al. | 320/15 |

FOREIGN PATENT DOCUMENTS 0111078  8/1980  Japan .................. 320/3

OTHER PUBLICATIONS

Soviet Inventions Illustrated, Week 8809, 3 Mar. 1988, Derwent Publications Ltd., London, GB; Class Q54, AN 88-062885 & SU-A-1 326 769 (Sokolov) 31 Mar. 1986-Abstract.
Soviet Inventions Illustrated, Week 8723, 17 Jun. 1987, Derwent Publications Ltd., London, GB; Class Q54, AN 87-161988 & SU-A-1 265 391 (Mosc Automech Inst) 17 Apr. 198-Abstract.
Soviet Inventions Illustrated, Week 8932, 20 Sep. 1989, Derwent Publications Ltd., London, GB; Class Q54, AN 89-233301 & SU-A-1 456-632 (Mosc Rail Transp Inst) 12 Jan. 1987-Abstract.
Soviet Inventions Illustrated, Week 8723, 17 Jun. 1987, Derwent Publications Ltd., London, GB; Class Q54, AN 87-161988 & SU-A1 265-291 (Mosc Automech Inst) 17 Apr. 1985-Abstract.

Primary Examiner—Steven L. Stephan
Assistant Examiner—Kristine Peckman
Attorney, Agent, or Firm—Staas & Halsey

[57] ABSTRACT

A power supply device for use on a motor vehicle includes a charging power supply such as an alternator or a battery, a plurality of capacitors, chargeable by the charging power supply, for supplying stored electric energy to an electric load such as an engine starter, and a successive charging control circuit arrangement for successively charging the capacitors, one by one, with the charging power supply.

7 Claims, 2 Drawing Sheets

POWER SUPPLY DEVICE

BACKGROUND OF THE INVENTION

The present invention relates to a power supply device having a charging power supply such as an alternator or a battery and a plurality of capacitors for supplying electric energy, which has been charged by the charging power supply, to an electric load.

Lead storage batteries are mounted on motor vehicles as a power supply for an engine starter and other electric loads such as accessories.

When the engine is to be started, electric energy stored in the load storage battery is supplied to energize the starter motor. A pinion gear of the starter motor is brought into mesh with a ring gear mounted on the crankshaft of the engine, and rotated to rotate the crankshaft, thereby starting the engine.

An electric current which is supplied from the battery to the starter motor when starting the engine is very high, e.g., 100 A or more, though it is supplied in a short period of time. The capacity of a battery to be installed on a motor vehicle is determined primarily in view of its ability to start the engine. The large electric power which is consumed to start the engine is supplemented when the battery is charged by electric power generated by an alternator mounted on the motor vehicle and driven by the engine while the motor vehicle is running.

Batteries mounted on motor vehicles are known lead batteries as secondary batteries, and they are charged and discharged through a chemical reaction between electrodes and an electrolytic solution. Such a battery can discharge a large current within a short period of time. The battery is charged with a current of 10 A or less which is supplied over a long period of time and through a gradual chemical reaction. Therefore, if a much larger current is supplied to charge the battery, the battery would be excessively heated and the electrodes might be deformed and damaged.

Motor vehicles which are mainly used by commuters run over short distances, and motor vehicles used as delivery cars are repeatedly stopped and started highly frequently. Since these motor vehicles require the engines to be started frequently and are continuously driven over short periods of time, the batteries mounted on these motor vehicles cannot be charged sufficiently enough to make up for the electric power consumed when the engines are started. Accordingly, the batteries tend to be used up, or run down, failing to start the engines.

To solve the above problems, the applicant has proposed a motor vehicle power supply device which has a large-capacitance capacitor that is charged by a battery mounted on the motor vehicle and that discharges stored electric energy to actuate the engine starter, thereby starting the engine (see Japanese Patent Application No. 63(1988)-329,846, U.S. patent application Ser. No. 454,267 and EPC Patent Application No. 89313559.0).

With the proposed motor vehicle power supply devices, the engine starter is energized by the electric energy stored in the large-capacitance capacitor. The large-capacitance capacitor can supply an intensive current. Therefore, even if the voltage of the battery is somewhat lowered, the engine may be started by the electric energy stored in the capacitor. To charge the capacitor after its stored electric energy has been discharged, a large initial current is required, and hence the alternator and the battery and the large-capacitance capacitor have to be connected by thick harnesses which can withstand large currents.

FIG. 3 of the accompanying drawings schematically shows a circuit arrangement in which a plurality (e.g., three) of capacitors are employed to provide a large capacitance. The capacitors are charged by an alternator, and a starter is connected as an electric load to the capacitors. The capacitors, which are connected parallel to each other, and the alternator are coupled to each other by thick harnesses. During an initial stage of the process of charging the capacitors, a large current flows through the harnesses into the capacitors. The large current tends to shorten the service life of the alternator since the alternator is overloaded.

SUMMARY OF THE INVENTION

It is an object of the present invention to provide a power supply device having a charging power supply and a plurality of capacitors for supplying electric energy, which has been charged by the charging power supply, to an electric load, the power supply device including means for reducing a rush current required to charge the capacitors, so that thick harnesses are not needed to connect the capacitors and the charging power supply.

Another object of the present invention is to provide a power supply device which will not overload a charging power supply such as an alternator that charges a plurality of capacitors of the power supply device.

According to the present invention, there is provided a power supply device comprising a charging power supply, a plurality of capacitors, chargeable by the charging power supply, for supplying stored electric energy to an electric load, and successive charging means for successively charging the capacitors with the charging power supply.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
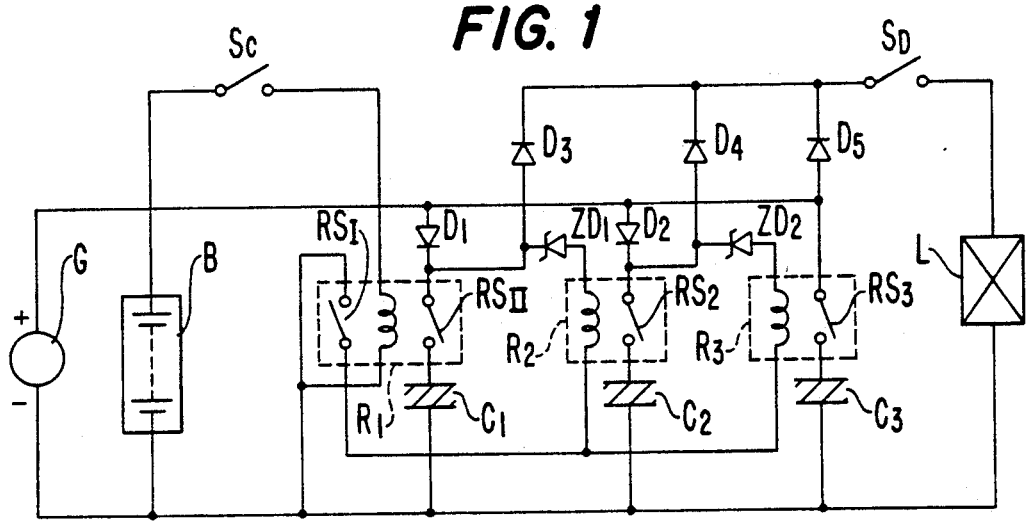
FIG. 1 is a circuit diagram of a power supply device according to an embodiment of the present invention.

FIG. 1 shows a power supply device for a motor vehicle, according to an embodiment of the present invention. The power supply device has a plurality (three in FIG. 1) of large-capacitance capacitors C1, C2, C3 connected parallel to each other, each of the capacitors C1, C2, C3 comprising an electric double layer capacitor.

An alternator G which is driven by an engine includes a rectifying circuit and produces DC electric energy at its output terminal. The alternator G serves as a power supply for charging the capacitors C1, C2, C3 and also a battery B. A switch SC serves as a charging switch for the capacitors C1, C2, C3. A switch SD serves to supply electric energy stored in the capacitors C1, C2, C3 to an electric load L such as an engine starter on the motor vehicle, for thereby starting the engine on the motor vehicle.

A relay circuit R1 has normally open contacts RSI, RSII, the contact RSII being connected to the positive terminal of the capacitor C1. A relay circuit R2 has a normally open contact RS2 connected to the positive terminal of the capacitor C2. A relay circuit R3 has a normally open contact RS3 connected to the positive terminal of the capacitor C3. The relay circuits R1, R2, R3 are connected such that when these relay circuits R1, R2, R3 are energized, circuits including their corresponding capacitors C1, C2, C3 are made or turned on.

Unidirectional elements comprising diodes D1 through D5 are connected to the capacitors C1, C2, C3. More specifically, when the capacitors C1, C2, C3 are charged, the diodes D1, D2 are connected in series with the capacitors C1, C2, respectively. When the capacitors C1, C2, C3 are discharged, the diodes D3, D4, D5 are connected in series with the capacitors C1, C2, C3, respectively.

Zener diodes ZD1, ZD2 allow only a small current to pass therethrough when a reverse voltage applied thereto is lower than a predetermined value (breakdown voltage), but allows a sudden reverse current to pass therethrough when the reverse voltage reaches the predetermined value. The zener diode ZD1 has a cathode connected to the terminal of the contact RSII remote from the capacitor C1, and an anode connected to the coil of the relay circuit R2. When the capacitor C1 is charged, the contact RSII is closed. In a final state of the process of charging the capacitor C1, the voltage across the capacitor C1 rises up to the breakdown voltage of the zener diode ZD1, whereupon a current from the alternator G and the battery B flows through the diode D1 and the zener diode ZD1 into the coil of the relay circuit R2. The contact RS2 of the relay circuit R2 is now closed to start charging the capacitor C2 with the current which is supplied through the diode D2.

The zener diode ZD2 has a cathode connected to the terminal of the contact RS2 remote from the capacitor C2, and an anode connected to the coil of the relay circuit R3. As is the case with the zener diode ZD1, the zener diode ZD2 detects a final stage of the process of charging the capacitor C2 and energizes the relay circuit R3 to charge the capacitor C3.

Operation of the power supply device thus constructed will be described below.

In order to charge the capacitors C1, C2, C3, the switch SC is closed. The coil of the relay circuit R1 is energized to close the contacts RSI, RSII thereof. The voltage of the alternator G and the battery B is applied through the diode D1 and the contact RSII to the capacitor C1, which now starts being charged.

After elapse of a certain period of time, which varies depending on the internal resistances of the alternator G and the battery B and the resistance of the circuit through which the charging current flows, the process of charging the capacitor C1 approaches its final stage. When the voltage across the capacitor C1 reaches the breakdown voltage of the zener diode ZD1, the relay circuit R2 is energized with the current flowing through the diode D1 and the zener diode ZD1. The contact RS2 of the relay circuit R2 is closed, whereupon the capacitor C2 starts being charged.

After elapse of a certain period of time, the process of charging the capacitor C2 also approaches its final stage. A sudden reverse current flowing through the zener diode ZD2 energizes the relay circuit R3, thereby charging the capacitor C3. During this time, the alternator G and the battery B supply a current, which is required to charge only one capacitor, successively to the capacitors C1, C2, C3. In this manner, the charging of the capacitors C1, C2, C3 is completed.

Figure 2:
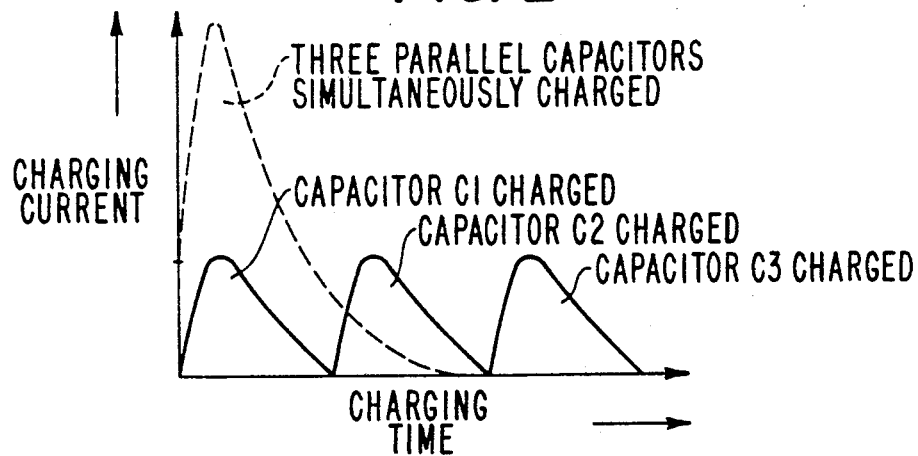
FIG. 2 is a graph showing the relationship between a charging time and a current required to charge capacitors.

FIG. 2 shows the relationship between a charting time and a charging current which is supplied to charge the capacitors C1, C2, C3. The solid-line curve shows the charging current supplied from the alternator G and the battery B in the power supply device according to the present invention. The dotted-line curve shows a charging current which is required to charge three parallel-connected capacitors in a conventional power supply device. The current supplied to charge the capacitors in the power supply device of the present invention is of a peak value which is about $\frac{1}{3}$ of the peak value of the charging current flowing into the capacitors in the conventional power supply device.

When the switch SD is closed, the electric energy stored in the capacitor C1, the electric energy stored in the capacitor C2, and the electric energy stored in the capacitor C3 are simultaneously supplied through the respective diodes D3, D4, D5 to the electric load L. Therefore, a rush current is fed to the engine starter, for example, to energize the engine starter, thus starting the engine.

After the engine has started, the switch SD is opened to stop the discharging of the electric energy from the capacitors C1, C2, C3. The capacitors C1, C2, C3 thus discharged can be charged again in the manner described above.

With the present invention, as described above, the large-capacitance capacitors C1, C2, C3 are not simultaneously charged by the alternator G or the battery B, but are successively charged, one by one, by the zener diodes ZD1, ZD2 and the relay circuits R2, R3, which serve as a successive charging means. The peak value of the charging current required to charge the capacitors C1, C2, C3 is much lower than that of the charging current supplied to charge the capacitors in the conventional power supply device. Therefore, the charging power supply and the capacitors may be connected by wires which have a much lower current capacity. Since the wires used have a small cross-sectional area, the harnesses can be wired with ease. The charging current supplied during an initial charging stage has a low peak value, the charging power supply or alternator is prevented from being overloaded, and the service life of the alternator is not unduly shortened.

Although a certain preferred embodiment has been shown and described, it should be understood that many changes and modifications may be made therein without departing from the scope of the appended claims.

What is claimed is:

1. A power supply device comprising:
   a charging power supply;
   a plurality of capacitors connected parallel to said charging power supply and being chargeable by said charging power supply, for supplying stored electric energy to an electric load;

successive charging means for successively charging said capacitors with said charging power supply; and said successive charging means comprising detecting means for detecting the amount by which each of said capacitors is charged, and connection control means, responsive to detection of a fully charged condition of one of said capacitors, for connecting another uncharged one of said capacitors to said charging power supply and for keeping the charged capacitor connected to said charging power supply.

2. A power supply device according to claim 1, wherein said charging power supply comprises an alternator.

3. A power supply device according to claim 1, wherein said charging power supply comprises a battery.

4. A power supply device according to claim 1, wherein said detecting means comprises means for detecting the voltage across each of said capacitors.

5. A power supply device according to claim 4, wherein said detecting means comprises a zener diode.

6. A power supply device according to claim 5, wherein said control means comprises a relay circuit having a coil connected to said zener diode.

7. A power supply device according to claim 1, wherein said capacitors are connected parallel to said electric load.

* * * * *

UNITED STATES PATENT AND TRADEMARK OFFICE
CERTIFICATE OF CORRECTION

PATENT NO. :    5,119,010

DATED      :    JUNE 2, 1992

INVENTOR(S) :   AKIHIRO SHIRATA ET AL.

It is certified that error appears in the above-identified patent and that said Letters Patent is hereby corrected as shown below:

Drawing sheet 2 should be deleted to be replaced with drawing sheet 2, as shown on the attached page.

Signed and Sealed this

Seventeenth Day of August, 1993

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,119,010
DATED : 06/02/92
INVENTOR(S) : Akihiro Shirata ET AL

Figure 3:
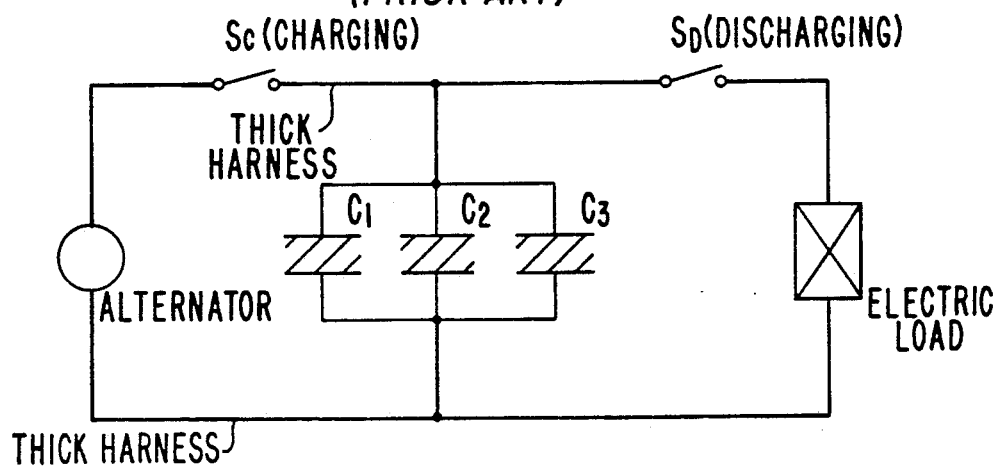
FIG. 3 is a circuit diagram of a conventional power supply device which employs a plurality of capacitors which are connected parallel to each other.
Figure 3:
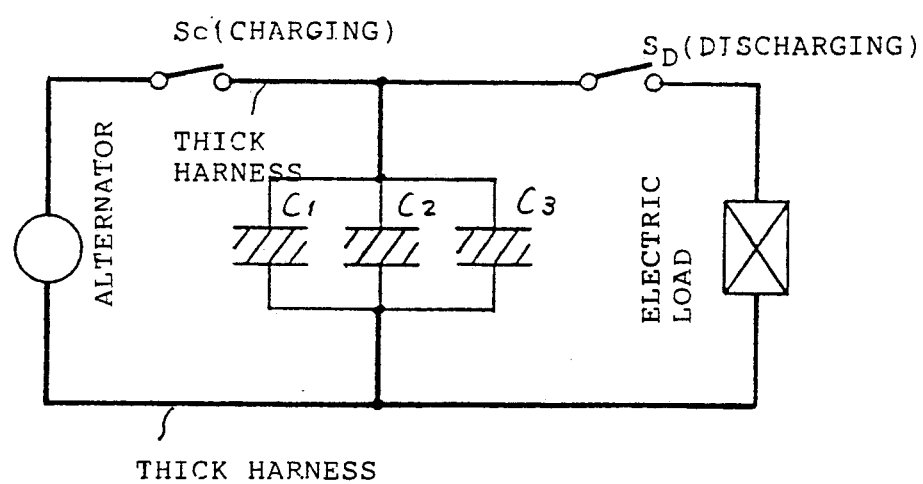
Figure 3:
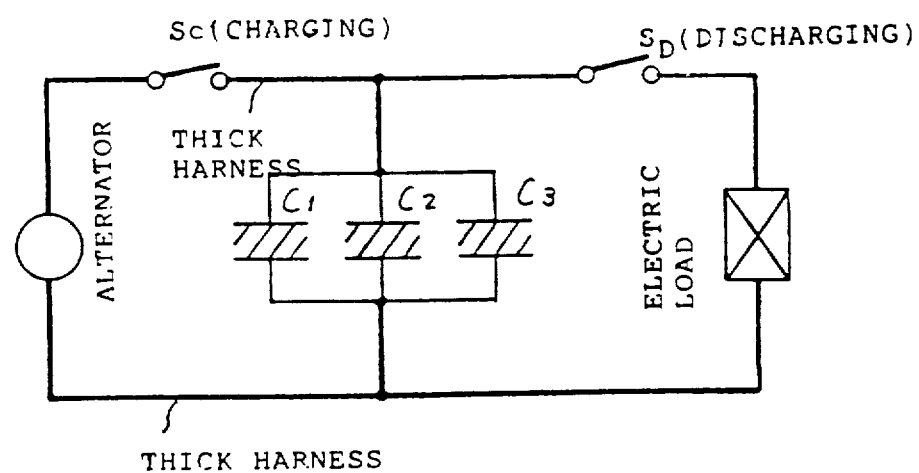
Figure 3:
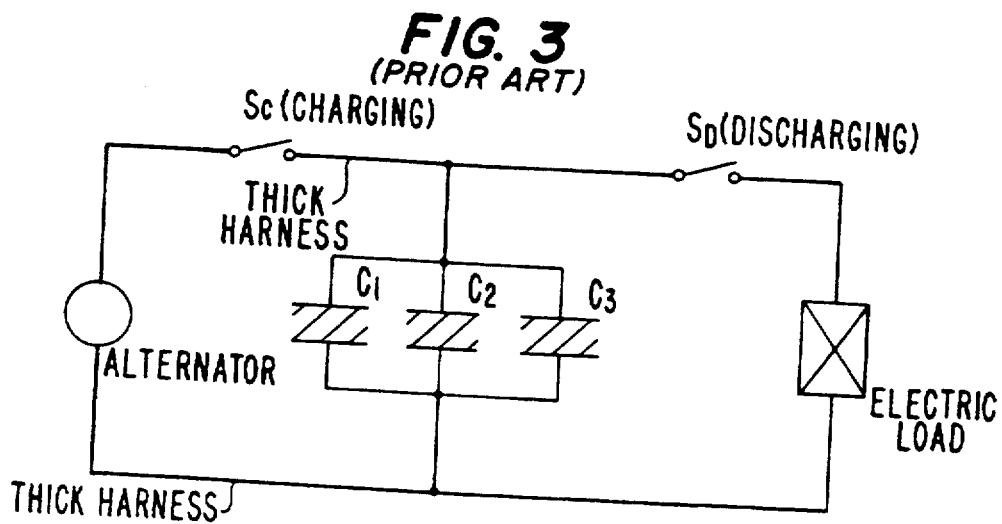

It is certified that error appears in the above-indentified patent and that said Letters Patent is hereby corrected as shown below:

The drawing sheet consisting of Figure 3 sheet 2, should be deleted to be replaced with the drawing sheet, consisting of Figure 3, sheet 1, as shown on the attached page.

Signed and Sealed this

Second Day of August, 1994

Attest:

BRUCE LEHMAN

Attesting Officer

Commissioner of Patents and Trademarks